(12) United States Patent
Ryan et al.

(10) Patent No.: US 7,092,262 B2
(45) Date of Patent: Aug. 15, 2006

(54) SYSTEM AND METHOD FOR PRE-CHARGING THE DC BUS OF A UTILITY CONNECTED POWER CONVERTER

(75) Inventors: Michael J. Ryan, Sherman Oaks, CA (US); Mark G. Gilbreth, Woodland Hills, CA (US); Kenneth W. Keller, Reseda, CA (US); Simon R. Wall, Faversham (GB)

(73) Assignee: Capstone Turbine Corporation, Chatsworth, CA (US)

( * ) Notice: Subject to any disclaimer, the term of this patent is extended or adjusted under 35 U.S.C. 154(b) by 132 days.

(21) Appl. No.: 10/813,550

(22) Filed: Mar. 31, 2004

(65) Prior Publication Data

US 2005/0088868 A1    Apr. 28, 2005

Related U.S. Application Data

(60) Provisional application No. 60/515,198, filed on Oct. 28, 2003.

(51) Int. Cl.
*H02H 7/00* (2006.01)
*G05F 1/70* (2006.01)

(52) U.S. Cl. ..................... 363/51; 323/207
(58) Field of Classification Search .......... 363/51, 363/52, 55, 65, 67, 71; 323/207; 307/82
See application file for complete search history.

(56) References Cited

U.S. PATENT DOCUMENTS

| | | | | |
|---|---|---|---|---|
| 5,404,092 A | * | 4/1995 | Gegner | 323/207 |
| 5,631,814 A | * | 5/1997 | Zak | 363/37 |
| 6,275,392 B1 | * | 8/2001 | Streicher et al. | 363/35 |
| 6,720,674 B1 | * | 4/2004 | Gabrys | 307/68 |

* cited by examiner

*Primary Examiner*—Adolf Berhane
(74) *Attorney, Agent, or Firm*—Waddey & Patterson, P.C.; Lucian Wayne Beavers

(57) ABSTRACT

A system and method for pre-charging the DC bus of a utility connected power converter. In one embodiment, a full-wave rectifier circuit is coupled to the utility grid through an isolation transformer and circuit protector. The rectifier circuit output is connected to the DC bus of the power converter to provide a pre-charging current to the DC bus capacitors. The output from the rectifier circuit also supplies power to the control circuit power supply for the converter. When the control circuit closes the contactor of the converter system and activates the converter, the voltage across the DC bus capacitors is increased above the level of the rectified power grid voltage provided at the output of the pre-charge circuit. This reverse-biases the rectifier diodes, placing the pre-charge circuit into an inactive state. The impedance of the isolation transformer limits the in-rush current into the DC bus capacitors during the pre-charge.

18 Claims, 3 Drawing Sheets

SYSTEM AND METHOD FOR PRE-CHARGING THE DC BUS OF A UTILITY CONNECTED POWER CONVERTER

CROSS REFERENCE TO RELATED APPLICATIONS

This application claims the benefit of U.S. Provisional Patent Application No. 60/515,198, filed on Oct. 28, 2003, which is incorporated herein by reference in its entirety.

FIELD OF THE INVENTION

The present invention relates generally to power converters. More particularly, the present invention relates to a system and method for pre-charging the DC bus of a utility connected power converter.

BACKGROUND OF THE INVENTION

Power converters are used to convert AC utility power for use by load devices requiring a reduced or boosted AC or DC supply voltage and/or by load devices that require an AC supply voltage at frequencies that are different from the conventional 50/60 Hz utility grid supply. Conventional utility power converters often include a utility-side converter connected to the utility grid through a contactor and filter circuits. The output of the utility-side converter is typically rectified, boosted, and supplied to a DC bus, including charging one or more DC bus capacitors. The DC bus is then linked to the inputs of one or more load-side converters, the outputs of which are connected to a load device such as an AC or DC motor/generator or a battery or other energy storage system.

The power converter usually includes a control circuit containing control logic that initiates and regulates operation of the converter. The control circuit requires its own control power supply so that the control circuit can perform its start-up and initial control functions independent of the operation of the converter. In conventional utility grid power converters, a source of external power therefore must be connected to the converter to energize the internal control circuit power supply. This is often accomplished through the use of a battery or other power source that is separate from the utility grid.

In addition, a utility power converter includes a pre-charge circuit to pre-charge the DC bus capacitor(s) before the converter is activated. A conventional pre-charge circuit often uses a resistor network connected in parallel with the power line contactor, utilizing the diodes inherent in the utility-side converter to rectify the grid power into the DC bus. Although the resistors are effective in limiting the in-rush current to the DC bus capacitor(s), they introduce energy losses from resistive heating. The resistors are subject to overheating and failure in the event of an electrical fault in the contactor circuit, and/or a fault in a converter on the DC bus. Also, because the resistor network electrically connects the contactor to the DC bus, there is no galvanic isolation between the power grid and the output of the converter.

What is needed is a pre-charge system and method for a power converter without the disadvantages described above.

BRIEF SUMMARY OF THE INVENTION

The present invention provides a system and method for pre-charging the DC bus of a utility connected converter system. It is applicable to a wide range of converter systems such as, for example, microturbine systems, fuel cells systems, wind machine systems, and photovoltaic systems, over a wide range of power levels.

It is a feature of the present invention that an isolation transformer provides impedance to limit the in-rush current to the DC bus capacitors and galvanic isolation between the utility grid and the converter system when its contactor is open.

It is also a feature of the present invention that no batteries or other auxiliary power source is needed to operate the converter system's control circuit power supply.

Further embodiments, features, and advantages of the present invention, as well as the structure and operation of the various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable persons skilled in the pertinent art(s) to make and use the invention.

Figure 1:
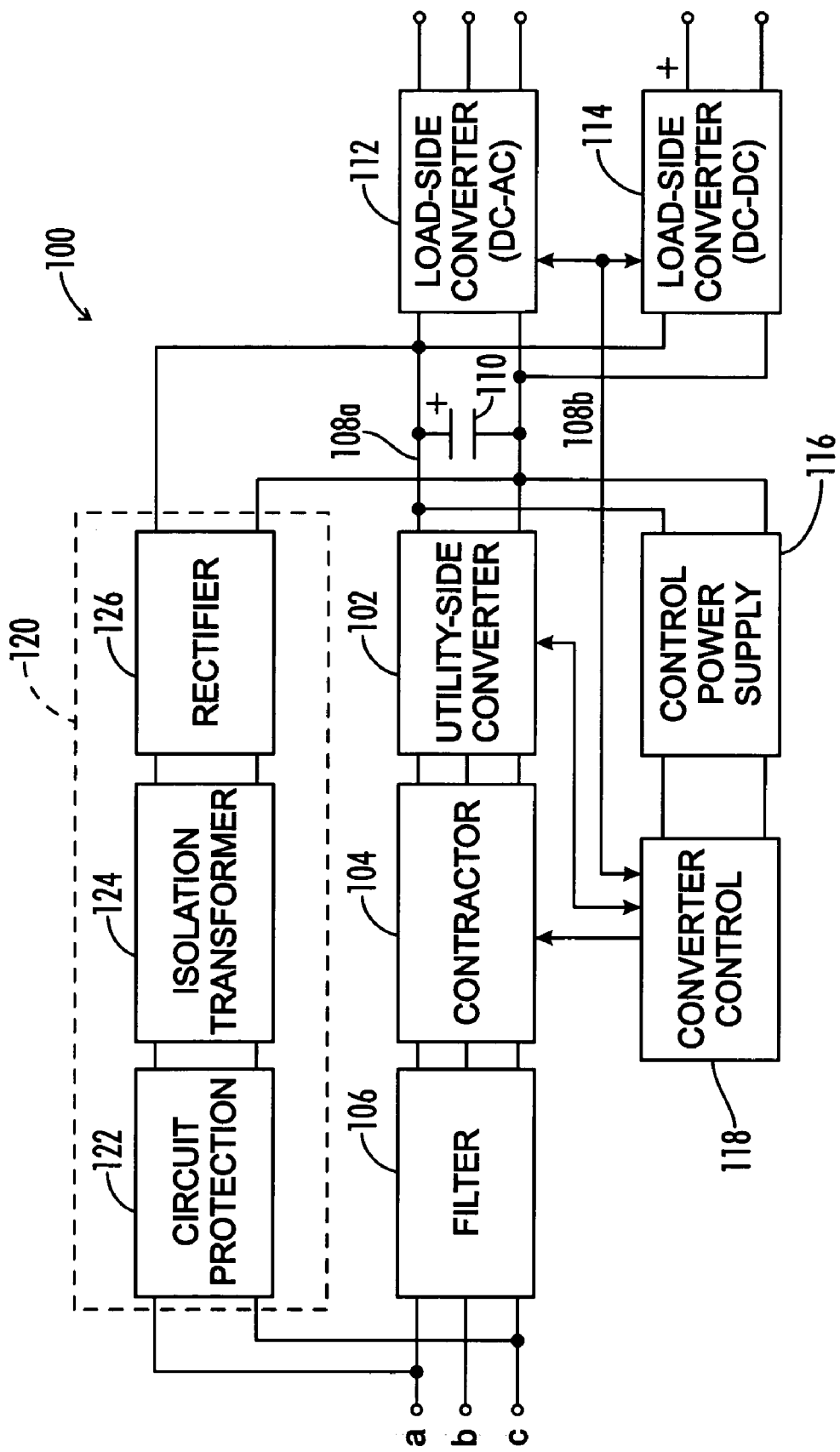
FIG. 1 is a block diagram and electrical schematic of a converter system with a pre-charge circuit according to an embodiment of the present invention.

The features and advantages of the present invention will become more apparent from the detailed description set forth below when taken in conjunction with the drawings in which like reference characters identify corresponding elements throughout. In the drawings, like reference numbers generally indicate identical, functionally similar, and/or structurally similar elements. The drawing in which an element first appears is indicated by the leftmost digit in the corresponding reference number.

DETAILED DESCRIPTION OF THE INVENTION

In one embodiment of the present invention, a rectifier circuit is coupled to the utility power grid through an isolation transformer and circuit protection. The rectifier circuit output is connected to the DC bus of the power converter to provide a pre-charging current to the DC bus capacitor(s). The output from the rectifier circuit also supplies power to the control circuit power supply for the converter. When the control circuit closes the contactor of the converter system and activates the converter, the voltage across the DC bus capacitor(s) is increased above the level of the rectified power grid voltage provided at the output of the pre-charge circuit. This reverse-biases the rectifier circuit diodes, placing the pre-charge circuit into an inactive state. The internal impedance of the isolation transformer limits the in-rush current into the DC bus capacitor(s) during the pre-charge. In addition, the transformer blocks the commonmode voltages inherently present on the DC bus during converter operation from being coupled to the utility grid.

FIG. 1 illustrates a converter system 100 with a pre-charge circuit 120 according to an embodiment of the present invention. The power converter includes a utility-side converter 102 electrically connected to terminals a, b, and c of a utility power grid (not shown) through an electrical contactor 104 and an optional filter circuit 106. Filter circuit 106 is conventional and can include passive and/or active components to reduce high frequency noise, signal artifact, harmonics, and/or to improve power factor. The utility power grid can provide single- or multi-phase AC electrical power, and is not limited to the three-phase power illustrated in the embodiment of FIG. 1. Typically, utility-side converter 102 will include supply side rectification, voltage buck or boost circuitry, and output side rectification, as is known by persons skilled in the relevant art(s). The rectified output of utility-side converter 102 is connected to a DC bus 108, which will usually include one or more DC bus capacitors 110. One or more DC links connect the DC bus to the inputs of one or more load-side converters. The outputs of the load converter(s) can, depending on the application, supply DC or single/multiphase AC power to one or more load devices (not shown) such as a motor/generator or DC energy storage device. The embodiment shown in FIG. 1 includes a DC-to-AC load-side converter 112 and a DC-to-DC load-side converter 114.

DC bus 108 is connected to the power input of a control power supply 116. Control power supply 116 includes control power output terminals that are used to supply operational power to a converter control circuit 118 for converter system 100. The converter control circuit conventionally includes logic functional to operate contactor 104 as well as to activate, monitor, and control utility-side converter 102 and load-side converters 112 and 114.

As shown in FIG. 1, a pre-charge circuit 120 has input terminals connecting, for example, power grid terminals a and c to the input of circuit protection 122. Circuit protection 122 is conventional circuit protection that provides, for example, overload protection. The output of circuit protection 122 is connected to the primary winding of an isolation transformer 124. The secondary winding of isolation transformer 124 is connected to the input of a rectifier 126. The output of rectifier 126 is connected to DC bus 108.

Figure 2:
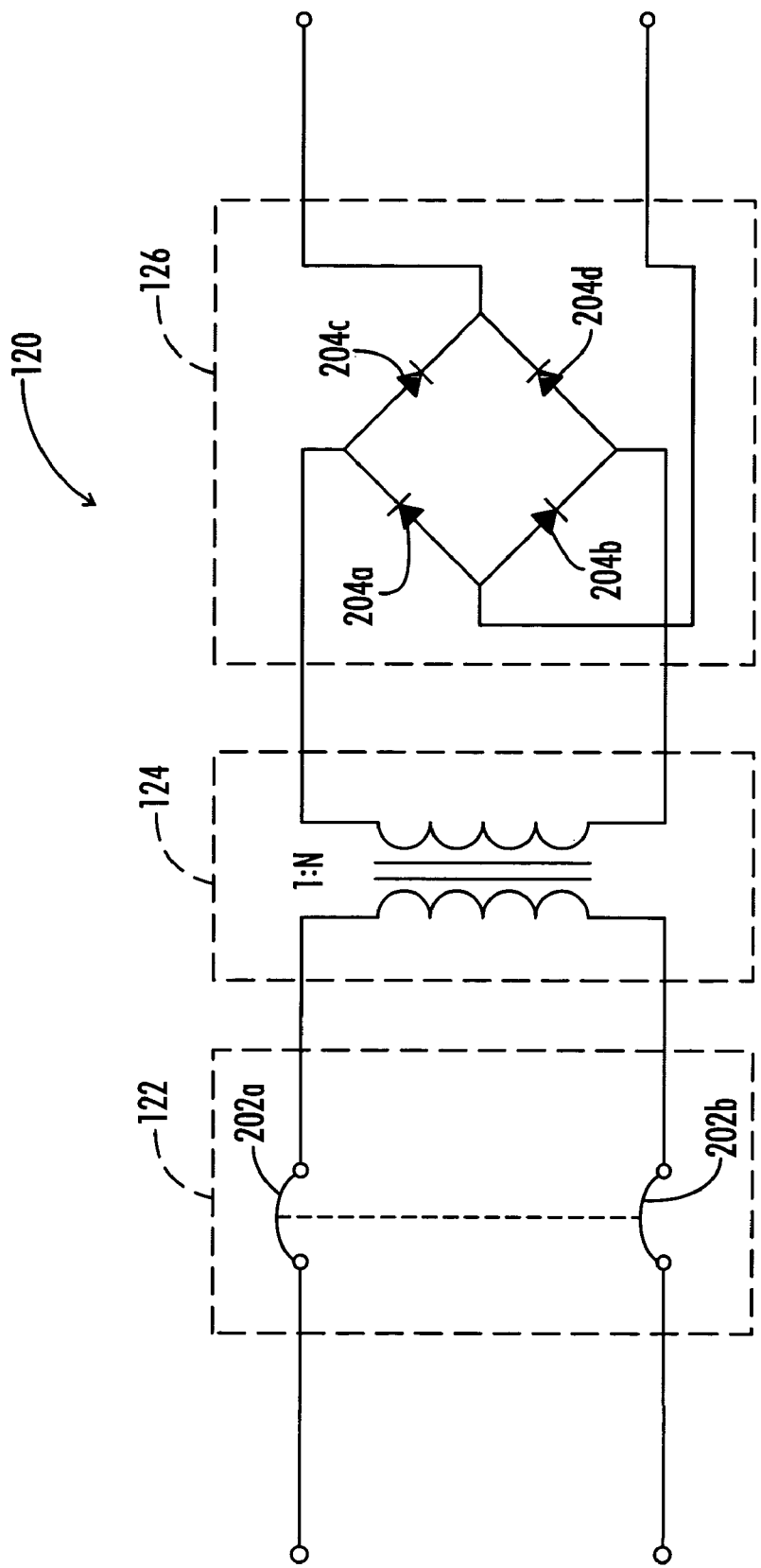
FIG. 2 is a more detailed electrical schematic of the pre-charge circuit of FIG. 1.

FIG. 2 is a more detailed electrical schematic of pre-charge circuit 120. As shown in FIG. 2, each input conductor of pre-charge circuit 120 has its own circuit protection element 202. In one embodiment, elements 202 comprise a conventional multi-pole circuit breaker (e.g. a 2-pole circuit breaker having elements 202a and 202b). In another embodiment, elements 202 are fuses. Clearly, circuit protection 122 can be any element or combination of elements that protect the circuit from overload.

Isolation transformer 124 has a turns ratio of 1-to-N. In one embodiment, isolation transformer 124 has a turns ratio of 1-to-1. In other embodiments, transformer(s) having turns ratios other than 1-to-1 are used. As would be known to persons skilled in the relevant art(s), isolation transformer 124 can be implemented using more than just one physical transformer. The impedance(s) of the transformer(s) used limit the in-rush current of pre-charge circuit 120.

As shown in FIG. 2, in one embodiment, rectifier 126 is a full-wave bridge rectifier comprising four diodes 204a, 204b, 204c, and 204d. The present invention is not limited however to using a full-wave bridge rectifier. Other rectifiers are used in other embodiments.

In operation, when the utility power grid is energized, an unrectified AC voltage from the power grid is connected to rectifier 126 of pre-charge circuit 120 through circuit protection 122 and isolation transformer 124. A rectified voltage is then supplied by the output of pre-charge circuit 120 to DC bus 108, charging DC bus capacitor(s) 110 up to a level corresponding to the output value of isolation transformer 124. As would be known to persons skilled in the relevant art(s), the output value of isolation transformer 124 is dependent upon the windings ratio of isolation transformer 124 and how isolation transformer 124 is connected to the utility grid. Rectifier 126 also provides a rectified voltage to control power supply 116, which in turn supplies operational power to the converter control circuit (not shown) of converter system 100. The in-rush current from pre-charge circuit 120 to DC bus capacitor(s) 110 is primarily limited by the impedance of isolation transformer 124.

When converter control circuit 118 is commanded by internal or external logic to energize converter system 100, contactor 104 is closed and utility-side converter 102 is activated. DC bus capacitor(s) 110 are charged by utility-side converter 102 to a voltage level that exceeds the rectified voltage at the output of pre-charge circuit 120. This reverse biases diodes 204 of rectifier 126, thereby effectively deactivating pre-charge circuit 120. The DC bus voltage is coupled by DC links to load-side converters 112 and 114, which in turn supply operational power to load devices (not shown). Isolation transformer 124 provides continuous galvanic isolation.

As will be understood by persons skilled in the relevant art(s), each of the components of converter system 100 and pre-charge circuit 120 must be appropriately selected and sized to meet the requirements of a particular application. Thus, specific values for the components described herein are not included. Persons skilled in the relevant art(s) will know how to determine specific values for these components for particular applications given the description herein.

Figure 3:
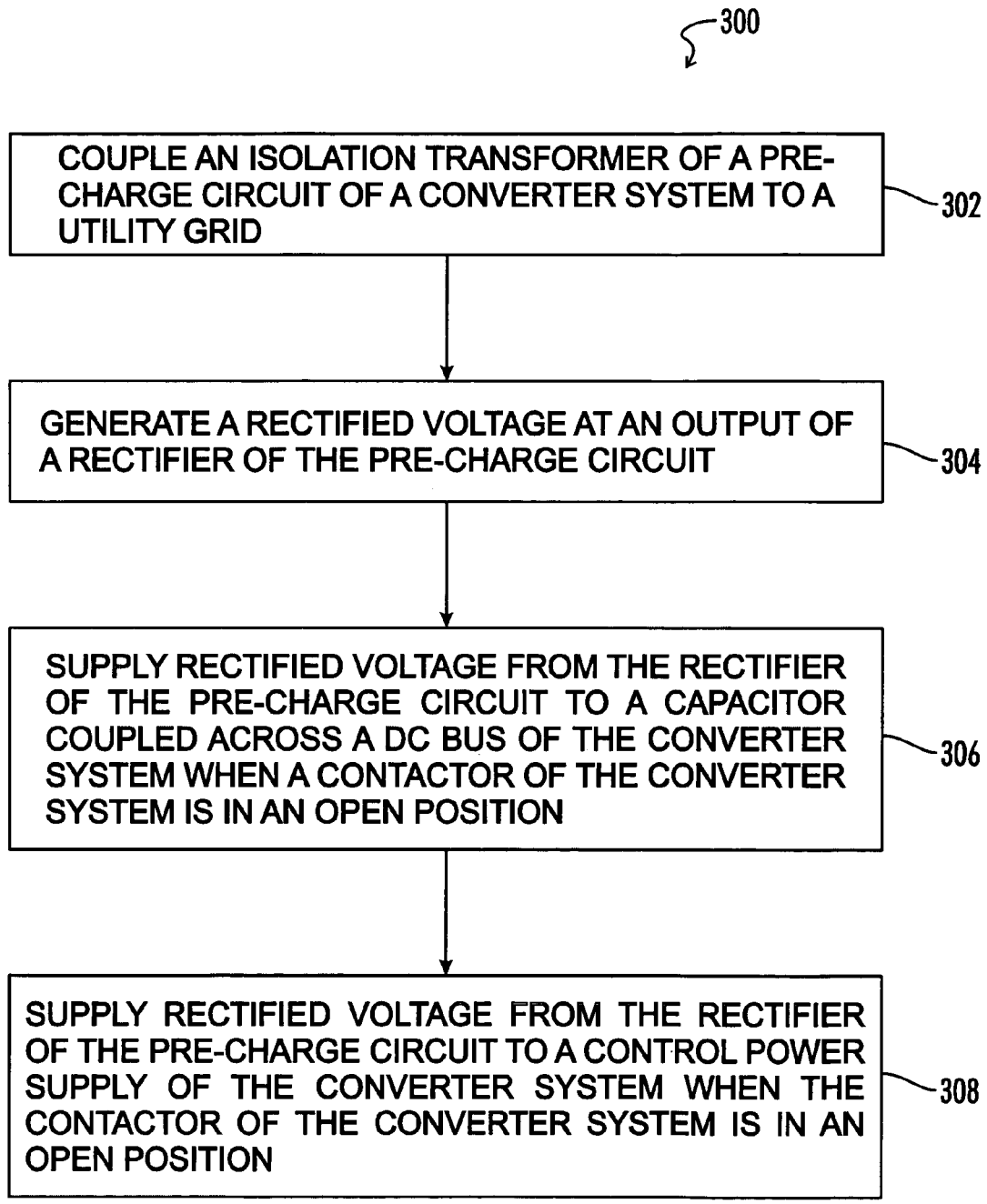
FIG. 3 is a flowchart of a method for pre-charging the DC bus of a utility connected converter system according to an embodiment of the present invention.

FIG. 3 is a flowchart of a method 300 for supplying rectified voltage to the DC bus of a utility connected converter system using a pre-charge circuit that includes an isolation transformer and a rectifier. Method 300 also can be used to provide rectified voltage to a control power supply of a utility connected converter system, thus eliminating the need for a separate source of power such as, for example, a battery. As shown in FIG. 3, method 300 comprises four steps 302, 304, 306 and 308. Method 300 can be implemented using a system embodying the present invention described herein.

Method 300 starts with step 302. In step 302, the isolation transformer of the pre-charge circuit of the converter system is coupled to a utility grid. The transformer or transformers can be coupled to a single phase of the utility grid or multiple phases of the utility grid in a manner that would be known to persons skilled in the relevant art(s). In one embodiment, the transformer or transformers have a 1-to-1 turns ratio. The impedance of the transformer(s) are selected to limit the in-rush current of the pre-charge circuit.

In step 304, a rectified voltage is generated at an output of the rectifier of the pre-charge circuit. The output voltage of the rectifier is dependent on the type of rectifier used, the windings or turns ratio of isolation transformer(s) used, and how isolation transformer(s) are connected to the utility grid. In one embodiment, the rectified voltage is generated using a full-wave bridge rectifier.

In step 306, rectified voltage form the rectifier of the pre-charge circuit of the converter system is supplied to one or more capacitors coupled to the DC bus of the converter system. The voltage is only supplied when the contactor of the converter system is in an open position. When the contactor is in a closed position and the utility-side converter is activated, the one or more capacitors coupled to the DC bus are charged to a voltage level higher than the rectified voltage level of the pre-charge circuit, thereby reverse biasing the diodes of the pre-charge circuit rectifier. When this occurs, the pre-charge circuit becomes inactive.

In step 308, rectified voltage form the rectifier of the pre-charge circuit of the converter system is supplied to a control power supply of the converter system. As in step 306, the voltage is only supplied when the contactor of the converter system is in the open position. When the contactor is in the closed position and the utility-side converter is activated, the pre-charge circuit is inactive due to reverse biasing of the diodes of the pre-charge circuit rectifier.

As will be understood by persons skilled in the relevant art(s), steps 306 and 308 of method 300 are independent of one another. Therefore, in some method embodiments of the present invention, one of the steps 306 and 308 is omitted.

This disclosure presents a system and method for pre-charging the DC bus of a utility connected converter system. While various embodiments of the present invention have been described above, it should be understood that they have been presented by way of example only, and not limitation. It will be understood by those skilled in the art that various changes in form and details can be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A converter system, comprising:
    a DC bus having a first conductor and a second conductor;
    a capacitor coupled between the first conductor and the second conductor;
    a first converter coupled to the DC bus for connection to a utility grid;
    a contactor, coupled to the first converter, having an open position;
    a second converter coupled to the DC bus for connection to a load;
    a control power supply coupled to the DC bus;
    an isolation transformer; and
    a rectifier, coupled between the isolation transformer and the DC bus, that provides rectified voltage to the capacitor and the control power supply when the contactor is in the open position.

2. The system of claim 1, wherein the rectifier is a full-wave bridge rectifier.

3. The system of claim 1, wherein the isolation transformer has a turns ratio of 1-to-1.

4. The system of claim 1, wherein the isolation transformer couples the rectifier to a single phase of the utility grid.

5. The system of claim 1, wherein the isolation transformer couples the rectifier to multiple phases of the utility grid.

6. The system of claim 1, further comprising:
    a circuit protection device coupled to the isolation transformer.

7. The system of claim 1, wherein the circuit protection device comprises a circuit breaker.

8. The system of claim 1, wherein the circuit protection device comprises a fuse.

9. The system of claim 1, wherein the second converter is a DC-to-DC converter.

10. The system of claim 1, wherein the second converter is a DC-to-AC converter.

11. The system of claim 1, further comprising:
    a third converter coupled to the DC bus for connection to a load.

12. The system of claim 1, further comprising:
    a filter coupled to the contactor.

13. A method for pre-charging the DC bus of a utility grid connected converter system, wherein the converter system includes a DC bus, a capacitor coupled to the DC bus, a rectifier coupled to the DC bus, an isolation transformer coupled to the rectifier, a utility-side converter coupled to the DC bus, and a contactor coupled to the utility-side converter, the contactor having an open position, the method comprising:
    (a) coupling the isolation transformer to the utility grid;
    (b) generating a rectified voltage at an output of the rectifier; and
    (c) supplying rectified voltage from the rectifier to the capacitor when the contactor is in the open position.

14. The method of claim 13, wherein the converter system further comprises a control power supply coupled to the DC bus, the method further comprising:
    (d) supplying rectified voltage from the rectifier to the control power supply when the contactor is in the open position.

15. The method of claim 13, wherein step (a) comprises:
    coupling the isolation transformer to a single phase of the utility grid.

16. The method of claim 13, wherein step (a) comprises:
    coupling the isolation transformer to multiple phases of the utility grid.

17. The method of claim 13, wherein step (a) comprises:
    coupling an isolation transformer having a 1-to-1 turns ration to the utility grid.

18. The method of claim 13, wherein step (b) comprises:
    generating the rectified voltage with a full-wave bridge rectifier.

* * * * *